United States Patent [19]

Starkweather et al.

[11] Patent Number: 5,724,509
[45] Date of Patent: Mar. 3, 1998

[54] METHOD AND APPARATUS FOR SYNCHRONIZING IMPLEMENTATION OF CONFIGURATION INFORMATION IN A COMMUNICATION SYSTEM

[75] Inventors: James Alan Starkweather, Grapevine; Orlando Jesus Perdomo, Fort Worth; Deborah L. Rutan, Saginaw; Srinivas Miriyala, Arlington, all of Tex.

[73] Assignee: Motorola, Inc., Schaumburg, Ill.

[21] Appl. No.: 636,008

[22] Filed: Apr. 22, 1996

[51] Int. Cl.⁶ ............................................. G06F 17/00
[52] U.S. Cl. ............................................. 395/200.5
[58] Field of Search ................... 395/200.5, 200.51, 395/200.52, 670, 703, 712; 364/464.2

[56] References Cited

U.S. PATENT DOCUMENTS

5,359,730  10/1994  Marron ............................ 395/670
5,504,905   4/1996  Cherry et al. .................... 395/653
5,606,508   2/1997  Thiel ............................ 364/464.2
5,649,187   7/1997  Hornbuckle ....................... 395/653

*Primary Examiner*—Ellis B. Ramirez
*Attorney, Agent, or Firm*—Charles W. Bethards

[57] ABSTRACT

A communication system (100) for synchronizing implementation of configuration information includes a network manager (105) for transmitting the configuration information and communication devices (110, 115) coupled to the network manager (105) for receiving the configuration information and responding with confirmations indicating that the configuration information is acceptable. In response to receiving the confirmations, the network manager (105) provides to the communication devices (110, 115) an implementation time at which the communication devices (110, 115) begin to utilize the configuration information.

22 Claims, 7 Drawing Sheets

METHOD AND APPARATUS FOR SYNCHRONIZING IMPLEMENTATION OF CONFIGURATION INFORMATION IN A COMMUNICATION SYSTEM

FIELD OF THE INVENTION

This invention relates in general to communication systems, and more specifically to a way to synchronize configuration information in a communication system.

BACKGROUND OF THE INVENTION

Communication systems, such as selective call messaging systems, typically include numerous communication devices, such as base stations and network controllers, for providing messages to portable receivers carried by system subscribers. When communication system configurations and parameters are to be updated or changed, new information must be provided to all of the communication devices within the system. For example, when a messaging protocol, such as FLEX™, has been revised to include different features, the new protocol features must be programmed into all the base stations and network controllers so that the portable receivers can receive selective call messages encoded with the updated protocol.

Conventionally, the revised configurations and parameters are downloaded to the communication devices either manually or over communication channels such as wireline. The revised configurations and parameters are then executed upon receipt. In other words, as soon as changes have been successfully programmed into a communication device, the device begins operating using the changes. Therefore, different communication devices may begin operating with revised information at different times, resulting in non-uniform implementation of upgrades across communication systems.

Thus, what is needed is a way to synchronously implement revised information provided to communication devices included in a communication system.

DESCRIPTION OF A PREFERRED EMBODIMENT

Figure 1:
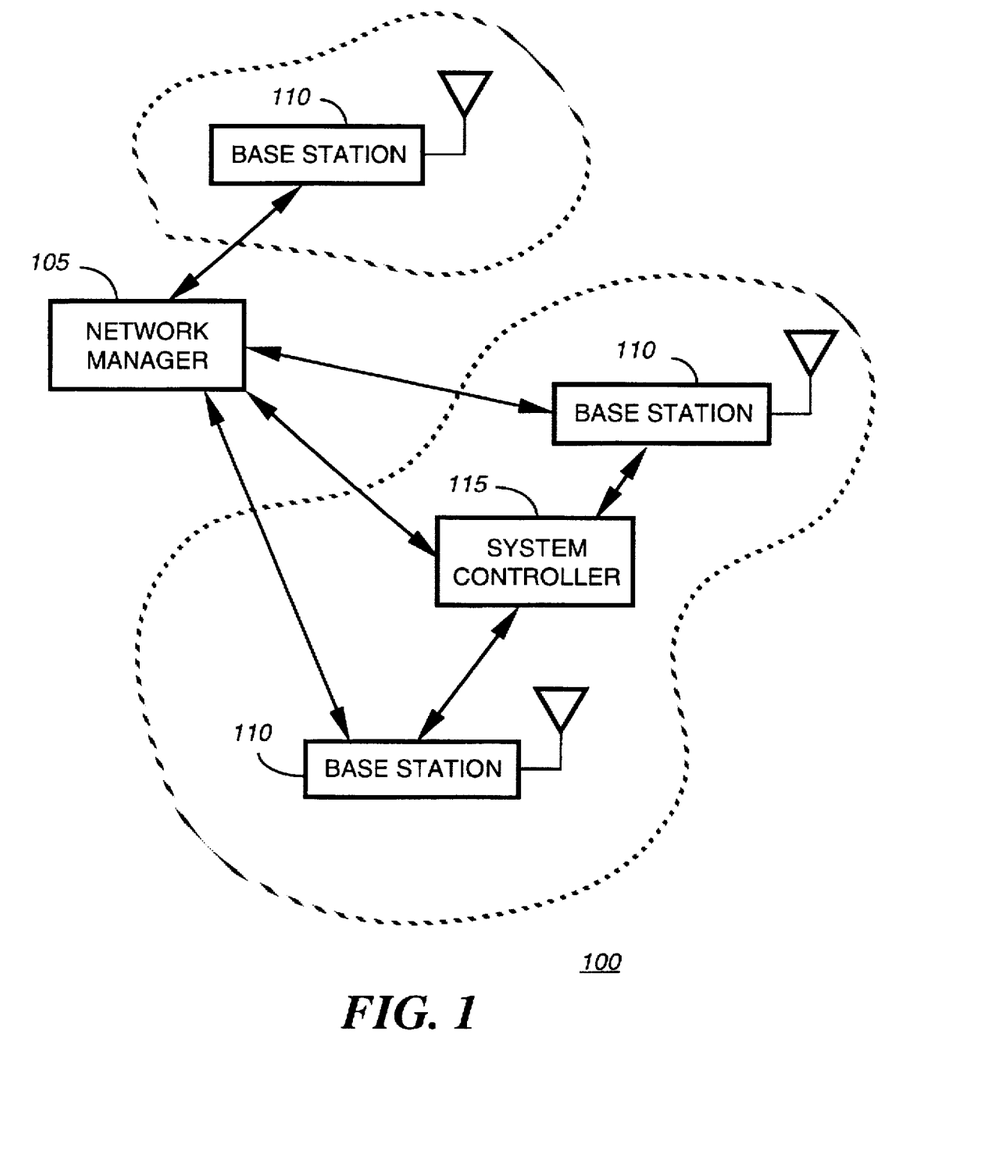
FIG. 1 is a block diagram of a communication system including communication devices and a network manager in accordance with the present invention.

FIG. 1 is a block diagram of a communication system 100 including a variety of communication devices, such as base stations 110 for providing selective call messages to personal communicators (not shown) and system controllers 115 for controlling at least some of the base stations 110. Additionally, in accordance with the present invention, the communication system 100 includes a network manager 105 for synchronizing the implementation of updated or revised information, i.e., configuration information, that is provided to the communication devices. Although only system controllers 115 and base stations 110 are depicted as the communication devices included within the communication system 100, other types of managed elements could also be included. For example, computers, selective call messaging terminals, and other programmable devices capable of being managed by the network manager 105 could also be included in the communication system 100.

The network manager 105 is coupled to the communication devices by communication channels such as wireline or radio frequency communication channels. Alternatively, or in combination with the above-mentioned channels, the network manager 105 could be coupled to the communication devices via a telephone network, such as the Public Switched Telephone Network (PSTN). When configuration information, such as software upgrades or revisions in communication protocols, is provided to the network manager 105, the configuration information is distributed to the communication devices. Thereafter, when all or a designated portion of the communication devices confirm acceptability of the configuration information, the network manager 105 transmits an implementation time to at least the confirming communication devices. At the implementation time, the communication devices then synchronously implement the configuration information. The network manager 105 can continue to monitor the communication devices to determine when the configuration change has become operational, subsequent to which the system controller 115 can be notified that the communication devices are operating with the new configuration.

As a result, revisions are implemented by all communication devices within the communication system 100 at the same time. This conveniently eliminates situations in which some communication devices are formatting messages using revised protocols while other communication devices are still formatting messages using outdated protocols, thereby ensuring that a roaming personal communicator does not miss messages as a result of incompatible protocols.

Figure 2:
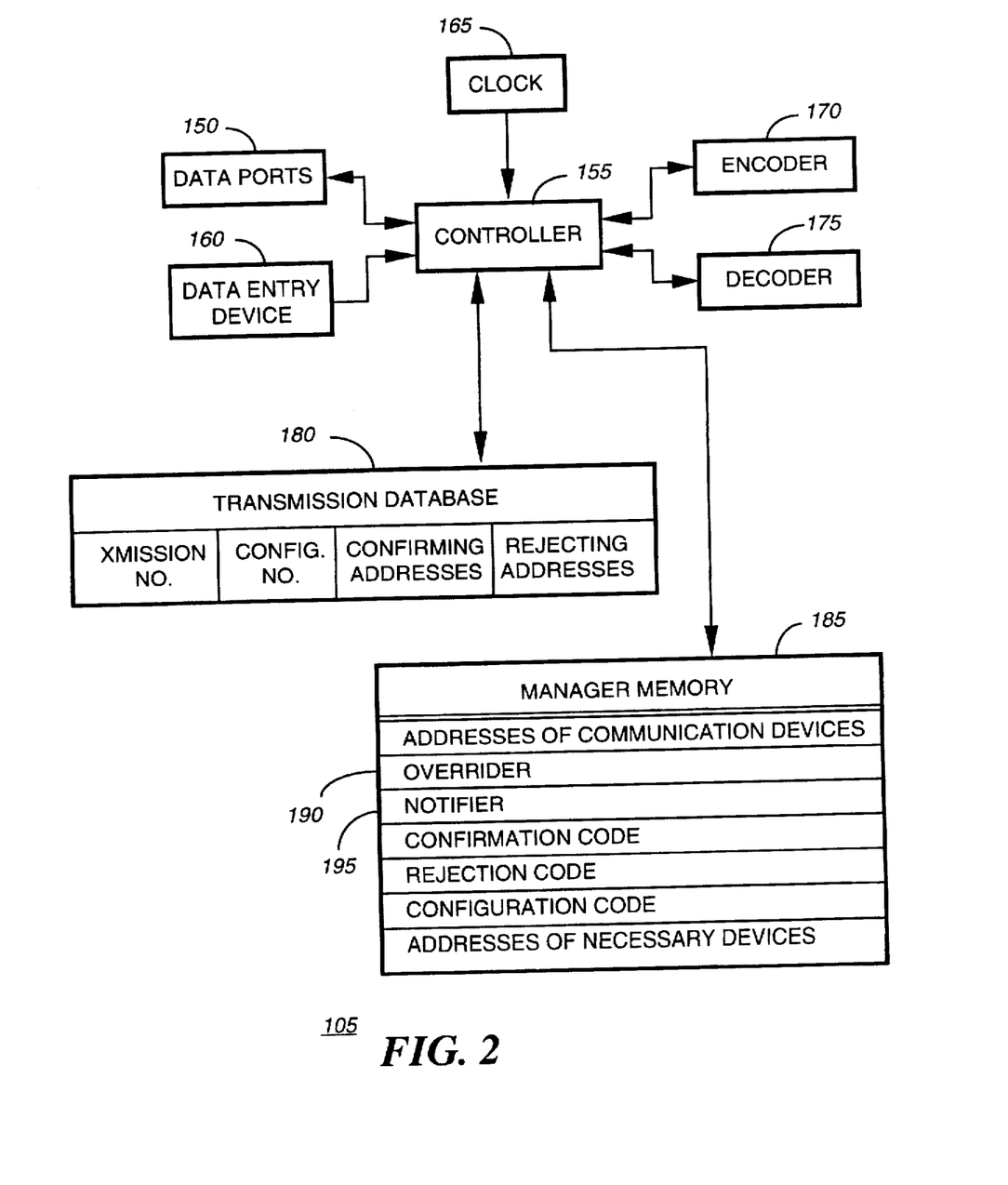
FIG. 2 is an electrical block diagram of the network manager included in the communication system of FIG. 1 in accordance with the present invention.

Referring next to FIG. 2, an electrical block diagram of the network manager 105 is shown. The network manager 105 preferably comprises data ports 150 for coupling to the communication devices. The data ports 150 could comprise, for instance, local area networks, wide area networks, modems, or radio transceivers. A data entry device 160 is also included for receiving configuration information as well as information for updating system characteristics. The data ports 150 and the data entry device 160 are coupled to a controller 155 for controlling the operations of the network manager 105. Further coupled to the controller 155 are a clock 165 for providing real time values, an encoder 170 for encoding information for transmission, and a decoder 175 for decoding received information.

A manager memory 185 is preferably coupled to the controller 155 for storing system characteristics, such as addresses of the communication devices that are managed by the network manager 105, a configuration code that indicates the presence of configuration information in a transmission, a confirmation code for recognizing a confirmation received from a communication device, and a rejection code for recognizing a rejection, which indicates unacceptability of received configuration information.

Additionally, the network manager 105 preferably includes a transmission database 180 for storing configuration information, a transmission number associated with stored configuration information, and addresses of communication devices that have confirmed or rejected the configuration information by sending confirmations and rejections to the network manager 105. The transmission number references particular configuration information and is helpful in situations in which more than one set of configuration information is currently being processed by the network manager 105. Preferably, when all communication devices have confirmed, the network manager 105 provides information, i.e., an implementation time, used by the communication devices to synchronously implement the configuration information. When any communication device has rejected the configuration information, the network manager 105 usually aborts implementation of the configuration information by all the communication devices.

According to the present invention, a notifier 195 references the clock 165 to generate a future implementation time at which communication devices should implement the configuration information. The implementation time is preferably provided to the communication devices only in response to determining that all of the communication devices have sent confirmations. However, an overrider 190 can, in some circumstances, override a rejection by a communication device so that the notifier 195 provides the implementation time to only the confirming communication devices. The manager memory 185 can, for instance, store addresses of "necessary devices" that must necessarily provide confirmations for configuration information. When all necessary communication devices, i.e., outer peripheral communication devices, have sent confirmations, those devices can be provided with an implementation time even when other unnecessary devices have rejected the configuration information. Preferably, the notifier 195 and the overrider 190 comprise firmware elements that are stored in the manager memory 185, although hardware capable of performing equivalent operations can alternatively be used.

By way of example, the network manager 105 can manage devices operated by multiple service providers that provide messaging services in different, non-overlapping geographic areas. In such a situation, communication devices associated with each service provider could be designated as separate necessary groups in the manager memory 185. Thereafter, when configuration information has been provided to all communication devices within the system 100 (FIG. 1), communication devices associated with a particular service provider could be started up with new configuration information even when communication devices associated with other service providers have rejected the revised information. In this manner, independent subsystems within the communication system 100 could synchronously implement configuration information at different implementation times.

Figure 3:
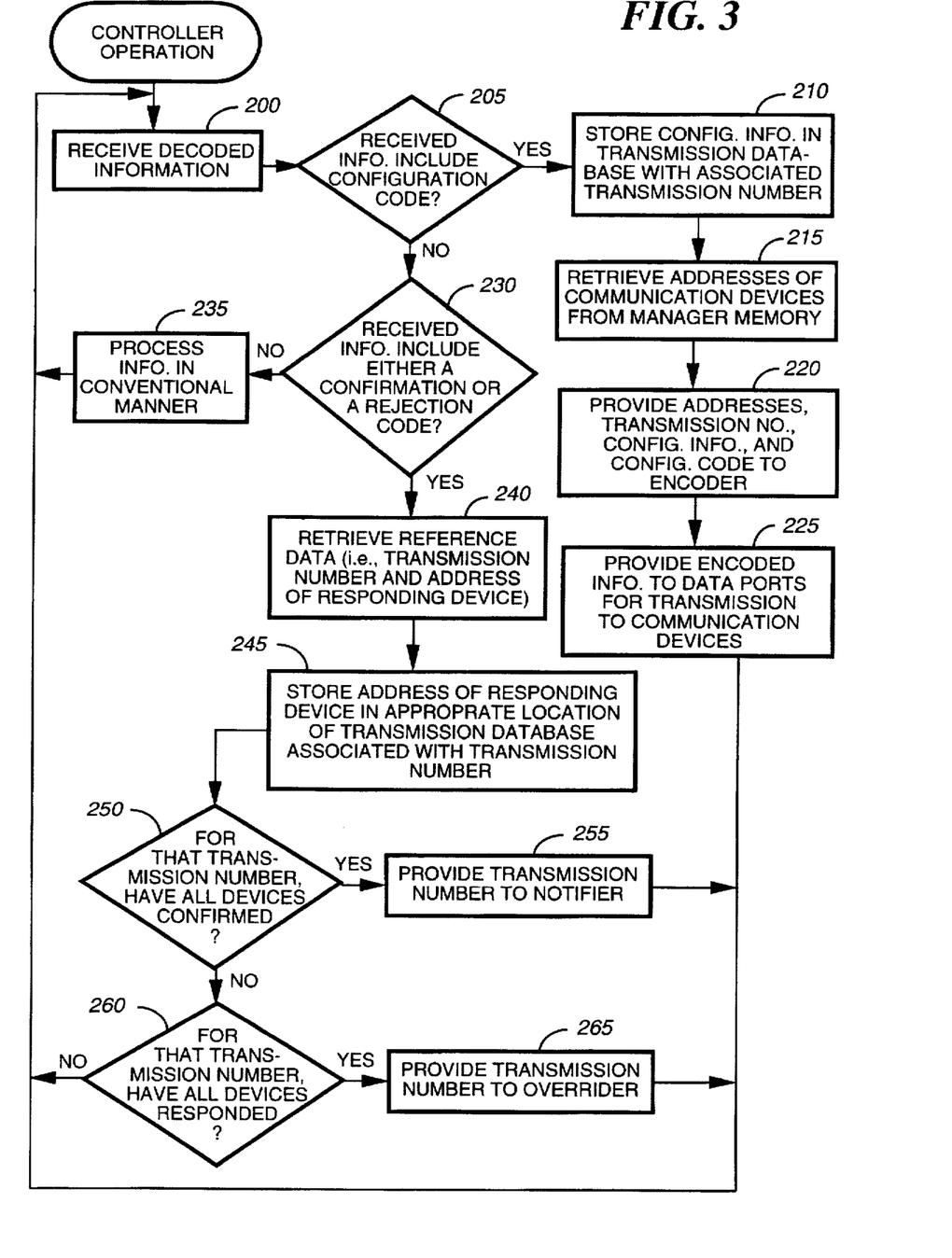
FIG. 3 is a flowchart of an operation of a controller included in the network manager of FIG. 2 in accordance with the present invention.

FIG. 3 is a flowchart of an operation of the controller 155 included within the network manager 105. After the controller 155 has provided information received, for instance, from the data entry device 160 to the decoder 175, it receives, at step 200, the decoded information. When, at step 205, the received information includes a configuration code indicative of configuration information, the configuration information is stored, at step 210, in the transmission database 180 (FIG. 2). Additionally, a transmission number is assigned by the controller 155 and stored with the configuration information for reference purposes. At step 215, the controller 155 retrieves the addresses of the communication devices from the manager memory 185, subsequent to which the addresses, the configuration code, the configuration information, and the corresponding transmission number are provided, at step 220, to the encoder 170. The encoded information is then forwarded, at step 225, to the data ports 150 for transmission to the communication devices within the communication system 100 (FIG. 1).

When, at steps 205, 230, the received information does not include the configuration code, the confirmation code, or the rejection code, the received information is processed in a conventional manner, at step 235. When, however, either the confirmation code or the rejection code is recognized, at step 230, reference data comprising a transmission number and an address of a responding device is retrieved, at step 240, from the received information. The address of the responding device is then stored, at step 245, at the appropriate location within the transmission database 180. Specifically, the address is stored in a location associated with the transmission number included in the received information, and the stored address is flagged to indicate whether the received information included a confirmation or a rejection.

When, at step 250, the controller 155 determines that all devices have confirmed for the current transmission number, the transmission number is provided, at step 255, to the notifier 195. When, at steps 250, 260, all communication devices have responded, although not all with confirmations, the transmission number is provided, at step 265, to the overrider 190. Additionally, the transmission number can be provided to the overrider 190 when all communication devices are accounted for by either a response or a time-out, such as when a response has not been received within a predetermined response time. Alternatively, when some of the communication devices have not responded within the predetermined response time, the network manager 105 could send inquiries to the non-responding devices and reset an internal counter for measuring response time.

Figure 4:
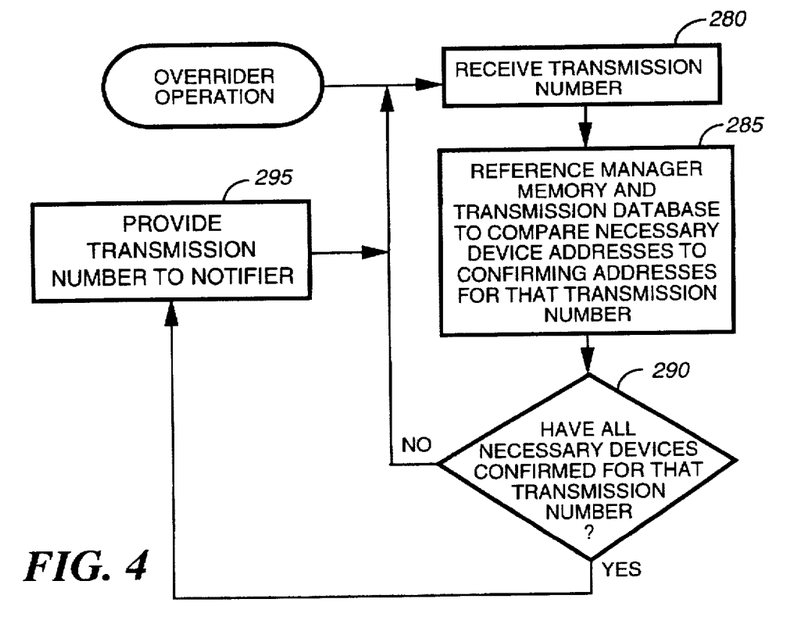
FIG. 4 is a flowchart of an operation of an overrider included in the network manager of FIG. 2 in accordance with the present invention.

FIG. 4 is a flowchart illustrating an operation of the overrider 190 in accordance with the present invention. At step 280, the overrider 190 receives a transmission number. Thereafter, at step 285, the manager memory 185 and the transmission database 180 are referenced to compare necessary device addresses with addresses of confirming devices for that transmission number. When, at step 290, all necessary devices have confirmed for that transmission number, the transmission number is provided, at step 295, to the notifier 195 such that received rejections are overridden, which results in provision of the implementation time to confirming devices and provision of an abort signal to the rejecting devices. Conversely, when even a single necessary device has not confirmed, the rejection will preferably not be overridden. However, as mentioned above, lack of response, rather than rejection, can result in further inquiries of the device on the part of the network manager 105.

Figure 5:
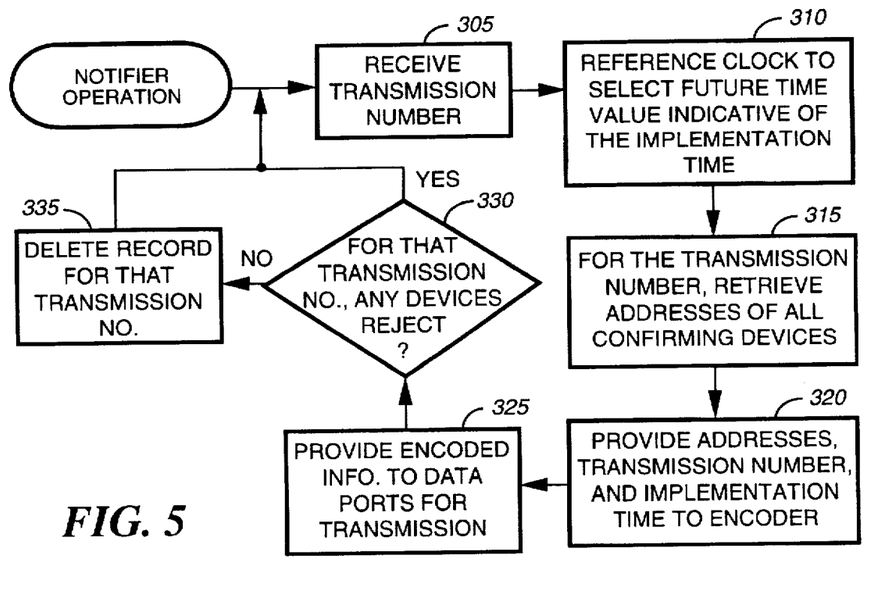
FIG. 5 is a flowchart depicting an operation of a notifier included in the network manager of FIG. 2 in accordance with the present invention.

Referring next to FIG. 5, a flowchart depicts an operation of the notifier 195 in accordance with the present invention. At step 305, the notifier 195 receives a transmission number from the controller 155 or from the overrider 190. The notifier 195 then, at step 310, references the clock 165 to select a future time value indicative of an implementation time at which all communication devices (or a necessary subset thereof) will implement the configuration information. The implementation time could be determined, for instance, by adding a predetermined amount of time to the time indicated by the referenced time value. Alternatively, when the configuration information is provided to the network manager 105, additional information could be provided to specify a preferred future time at which the configuration information would be implemented.

Next, at step 315, addresses of all confirming devices for the current transmission number are retrieved from the transmission database 180 and provided, at step 320, to the encoder 170. The transmission number and implementation time are provided, at step 320, to the encoder 170 as well. The encoded information is then forwarded, at step 325, to the data ports 150 for transmission to the confirming communication devices. When, at step 330, none of the communication devices rejected the configuration information, the record corresponding to the transmission number can be deleted, at step 335, from the transmission database 180.

The use of the notifier 195 and the overrider 190 in accordance with the present invention provides an advantageous method for synchronously implementing programmed configuration updates in all communication devices within a communication system 100. As a result, incompatibilities between different devices and portable communicators are conveniently eliminated to reduce the likelihood of missed messages within the system 100.

In conventional communication systems, on the other hand, revisions are typically implemented as soon as they have been programmed into a system device, such as a base station. Therefore, different communication devices may begin operating with revised information at different times, resulting in non-uniform implementation of upgrades across communication systems. This problem is minimized by use of the network manager 105 according to the present invention.

As described above, configuration information is preferably provided to all communication devices within the communication system 100. However, according to an alternate embodiment of the present invention, configuration information could be sent to only a portion of the communication devices, which allows for a "phased-in approach". For example, when the communication system 100 comprises two or more sub-systems, revisions could be intended only for devices associated with one of the sub-systems. This could be easily accomplished, for instance, by providing addresses of recipient devices to the network manager 105 along with the configuration information. Thereafter, the network manager 105 could provide only the intended recipients with the configuration information and await confirmation by only those devices, or a necessary sub-set thereof, before providing an implementation time.

According to another alternate embodiment of the present invention, necessary devices could also be indicated in the data packet in which configuration information is provided to the network manager 105. The addresses for the necessary devices could be easily stored in the transmission database 180 in the location associated with the corresponding transmission number. The overrider 190 could then reference the necessary devices associated with particular configuration information to determine whether a rejection should be overridden.

Figure 6:
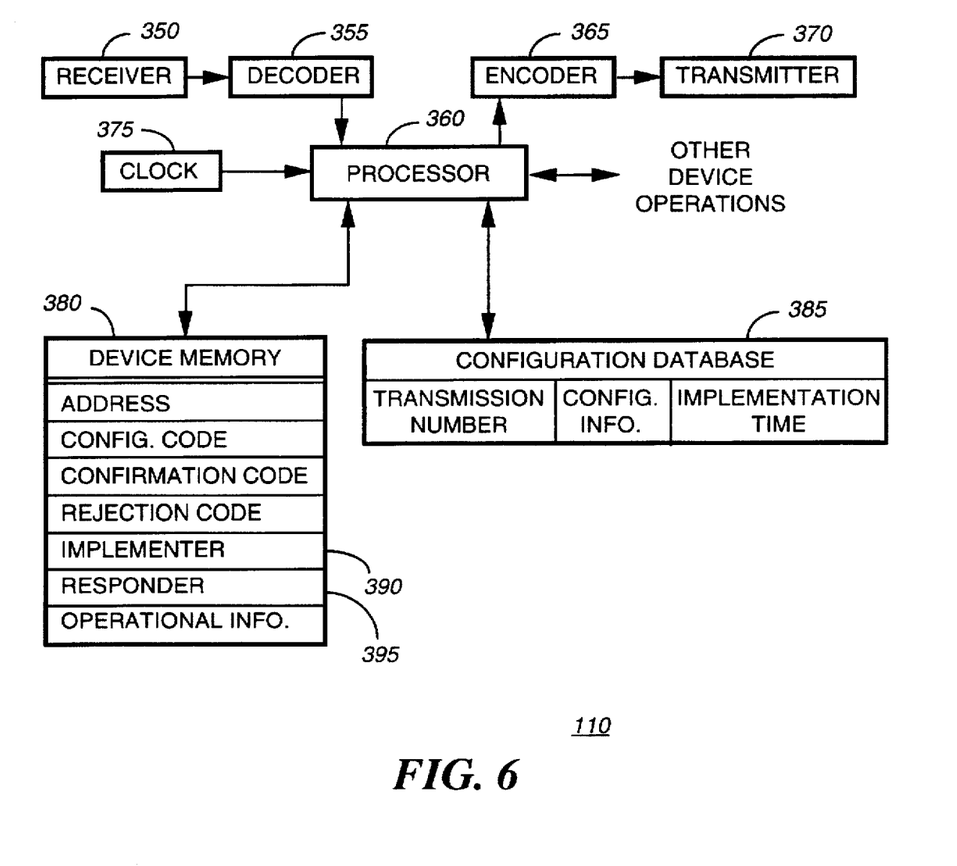
FIG. 6 is an electrical block diagram of a communication device included in the communication system of FIG. 1 in accordance with the present invention.

Referring next to FIG. 6, an electrical block diagram of a communication device 110, such as a base station, is depicted. The communication device 110 comprises a receiver 350, such as a radio receiver, modem, or other data port, for receiving configuration information and a decoder 355 for decoding received information. A processor 360 coupled to the decoder 355 controls operations of the communication device 110. Also coupled to the processor 360 is an encoder 365 for encoding information to be transmitted via a transmitter 370, which could comprise a radio transmitter, a modem, or another type of data port. A clock 375 is coupled to the processor 360 for providing time values thereto. Additionally, the processor 360 is preferably coupled to other elements (not shown) for performing conventional device operations.

According to the present invention, the communication device 110 includes a configuration database 385 for storing received information such as configuration information, a transmission number associated therewith, and an implementation time at which the configuration information will be implemented synchronously within the communication system 100. Additionally, a device memory 380 stores data such as the configuration code, the confirmation code, the rejection code, and operational information, such as parameters and configurations currently employed for operating the communication device 110. A device address, e.g., an internet protocol (IP) address, is preferably also stored.

The communication device 110 further includes a responder 395 for responding to the network manager 105 with a confirmation when received configuration information is acceptable and with a rejection when received configuration information is unacceptable. An implementer 390 implements received configuration information once the network manager 105 has provided an implementation time. Preferably, the responder 395 and the implementer 390 are firmware elements stored in the device memory 380, although hardware capable of equivalent operations can alternatively be employed.

Figure 7:
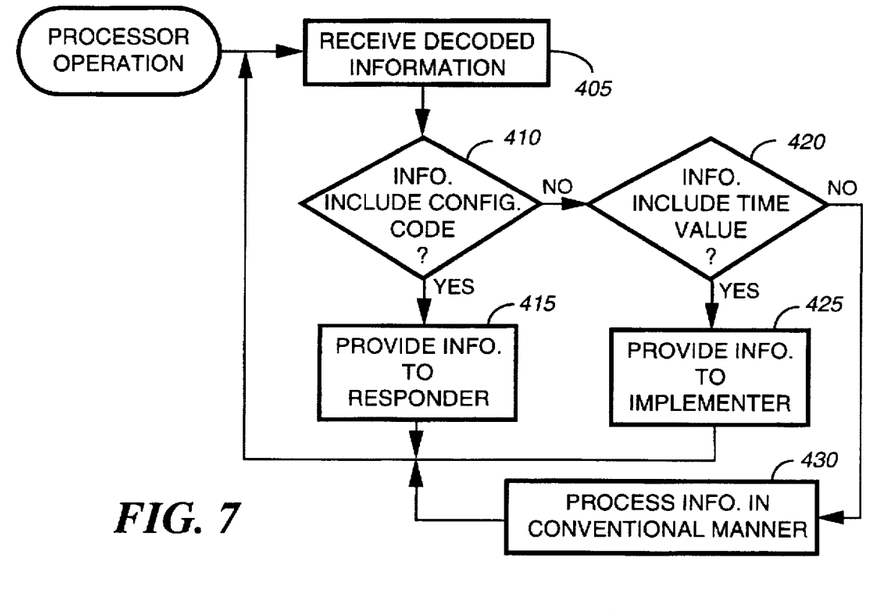
FIG. 7 is a flowchart illustrating an operation of a processor included in the communication device of FIG. 6 in accordance with the present invention.

FIG. 7 is a flowchart of an operation performed by the processor 360 according to the present invention. At step 405, decoded information is received. When, at step 410, a configuration code is included in the information, indicating the presence of configuration information, the received information is transmitted, at step 415, to the responder 395. When, at step 420, the received information includes a time value rather than a configuration code, the information is provided, at step 425, to the implementer 390. When neither a configuration code nor a time value is included, the information is processed in a conventional manner, at step 430.

Figure 8:
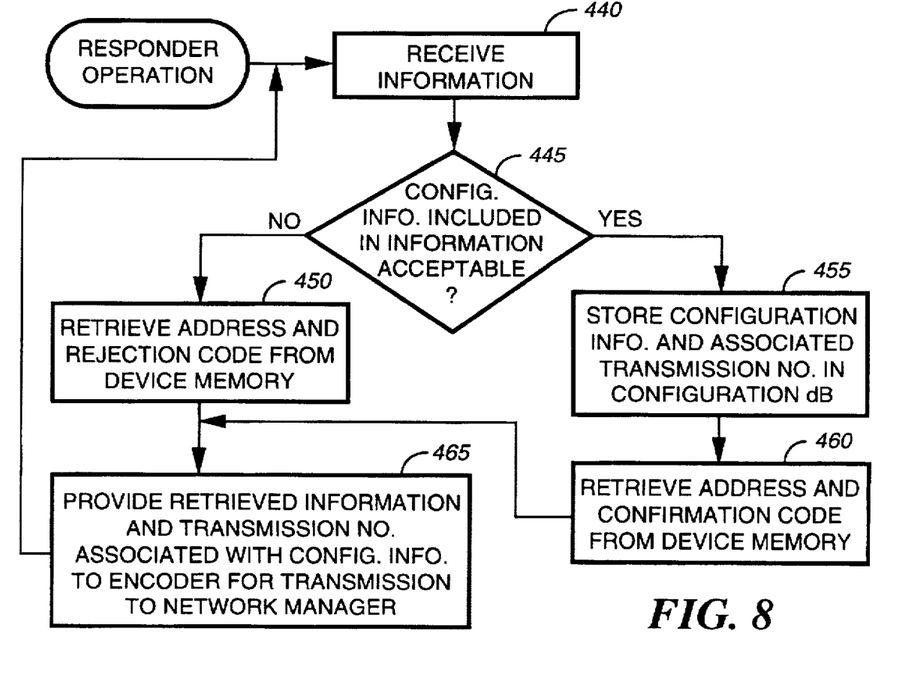
FIG. 8 is a flowchart depicting an operation of a responder included in the communication device of FIG. 6 in accordance with the present invention.

FIG. 8 is a flowchart depicting an operation of the responder 395, which, at step 440, receives configuration information from the processor 360 and, at step 445, determines whether the configuration information is acceptable or unacceptable. This decision can be performed in any of numerous conventional ways. For example, the configuration information could be found unacceptable when memory space for storage is unavailable, when a hardware change necessary for the revision has not yet been completed, or when errors were detected in the received information. When there appears to be no bar to successful storage and execution of the revision, the configuration information will generally be found acceptable.

When, at step 445, the configuration information is unacceptable, the device address and the rejection code are retrieved, at step 450, from the device memory 380. When, at step 445, the configuration information is acceptable, the configuration information and associated transmission number are stored, at step 455, in the configuration database 385. Thereafter, the device address and the confirmation code are retrieved, at step 460, from the device memory 380. The transmission number and data retrieved from the device memory 380 are then sent, at step 465, to the encoder 365 for subsequent transmission to the network manager 105.

Figure 9:
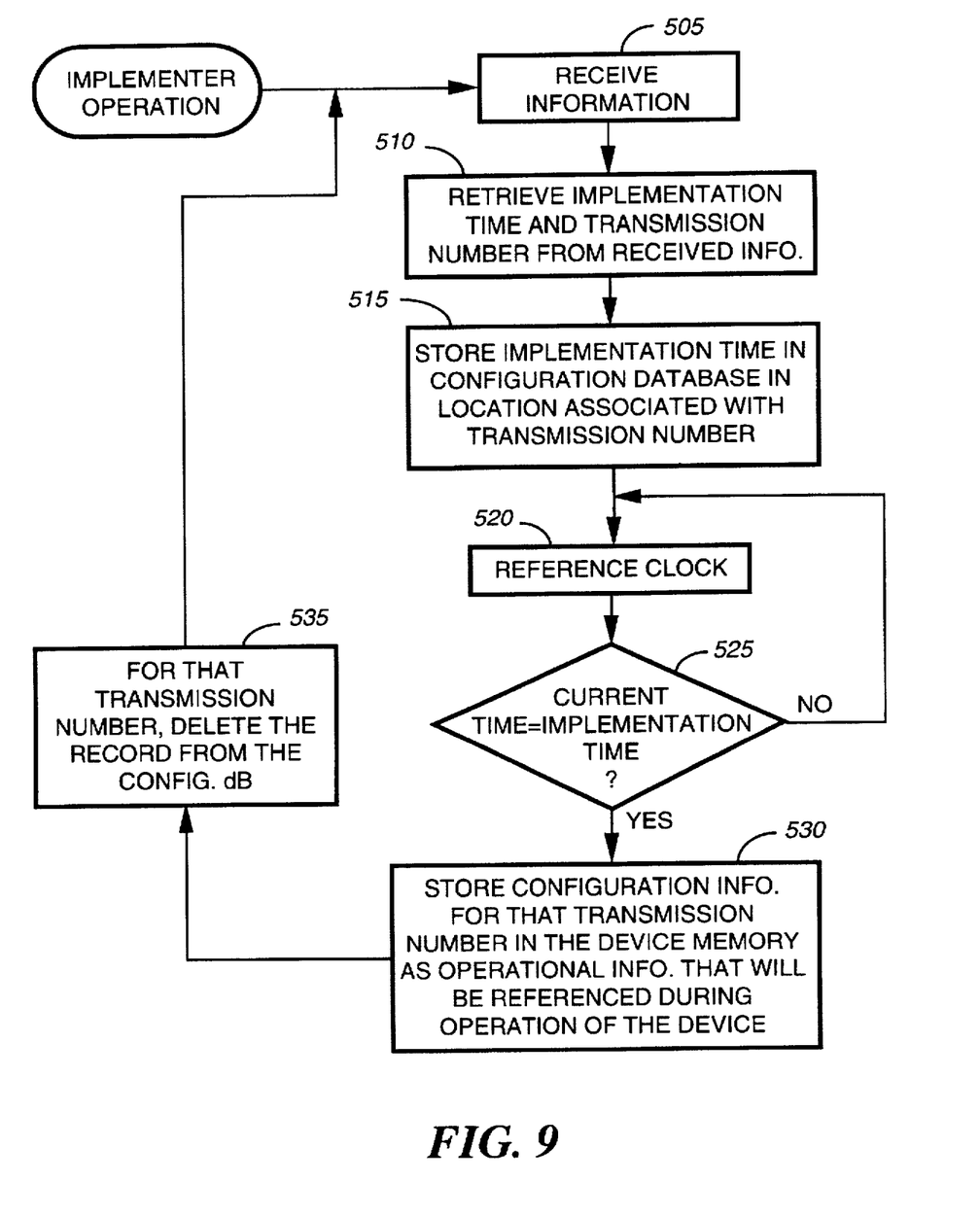
FIG. 9 is a flowchart illustrating an operation of an implementer included in the communication device of FIG. 6 in accordance with the present invention.

Referring to FIG. 9, a flowchart illustrates an operation of the implementer 390, which receives, at step 505, information from the processor 360. Next, at step 510, the implementer 390 retrieves the implementation time and the transmission number from the information, subsequent to which the implementation time is stored, at step 515, in the configuration database 385 in a location that is associated with the transmission number. It will be appreciated that the implementation time is only stored when the time has not yet passed. In situations in which the implementation time has already occurred, the device 110 preferably aborts implementation of the configuration information. At steps 520, 525, the implementer 390 references the clock 375 to determine whether the current time is equivalent to the implementation time. When the implementation time arrives, the configuration information for that transmission number is stored, at step 530, in the device memory 380 as a part of the operational information that is referenced during device operation. This step implements the configuration information synchronously with other communication devices in the communication system 100. Thereafter, the record associated with that transmission number can be deleted, at step 535, from the configuration database 385.

In summary, the communication system described above includes communication devices, such as base stations and system controllers, that are coupled to a network manager for managing programming updates within the communication system. When configuration information, such as software changes or protocol revisions, is received by the network manager, the configuration information is distributed to the communication devices. In response to receiving the configuration information, the communication devices evaluate the acceptability of the information and respond accordingly. Specifically, a communication device either confirms by sending a confirmation code or rejects by sending a rejection code. In response to receiving confirmations from all the communication devices, the network manager provides the devices with an implementation time at which all devices synchronously implement the configuration information. A rejection generally causes the network manager to abort implementation of the configuration information, such as by transmitting an abort signal to each device instructing it to discard the configuration information.

As mentioned, a rejection by one or more devices can sometimes be overridden, such a when the rejecting device is determined to be unnecessary for implementation of the configuration information. For example, when two separate and independent communication sub-systems are included in the communication system, the communication devices of one sub-system could implement a configuration change even when a communication device of the other sub-system rejected the configuration information.

The advantage of the communication system according to the present invention is that updates to operating parameters are executed at the same time by all communication devices so that incompatibilities within the system are minimized or eliminated. As a result, messaging within the system can be performed more reliably since situations are avoided in which portable communicators and communication devices, such as base stations, are operating with different protocol revisions.

It will be appreciated by now that there has been provided a way to synchronously implement revised information provided to communication devices included in a communication system. Furthermore, the provided method and apparatus afford minimal and predictable interferences with normal operations of the communication system.

What is claimed is:

1. A communication system for synchronizing implementation of configuration information, the communication system comprising:

a network manager for transmitting the configuration information; and communication devices coupled to the network manager for receiving the configuration information and responding with confirmations indicating that the configuration information is acceptable, wherein, in response to receiving the confirmations, the network manager provides to the communication devices an implementation time, occurrence of which results in the communication devices beginning to utilize the configuration information.

2. The communication system of claim 1, wherein the communication devices comprise means for determining that the configuration information is unacceptable, in response to which a rejection rather than a confirmation is provided to the network manager, and wherein, in response to reception of the rejection, the network manager can abort implementation of the configuration information.

3. The communication system of claim 2, wherein the network manager comprises:

a controller for controlling operations of the network manager;

data ports coupled to the controller for receiving the configuration information;

a manager memory coupled to the controller for storing addresses associated with the communication devices, a confirmation code for recognizing the confirmations, and a rejection code for recognizing rejections; and a transmission database coupled to the controller for storing the configuration information.

4. The communication system of claim 3, wherein the network manager further comprises a notifier for notifying the communication devices of the implementation time.

5. The communication system of claim 3, wherein the network manager further comprises a clock for generating time values used in determining the implementation time.

6. The communication system of claim 3, wherein the network manager further comprises an overrider for overriding the rejection by sending the implementation time to confirming communication devices and not to rejecting communication devices.

7. The communication system of claim 2, wherein a communication device included in the communication system comprises:

a processor for controlling operations of the communication device;

a receiver coupled to the processor for receiving the configuration information;

a configuration database coupled to the processor for storing the configuration information; and a device memory coupled to the processor for storing a confirmation code for indicating acceptability of the configuration information and a rejection code for indicating unacceptability of the configuration information.

8. The communication system of claim 7, wherein the configuration database further stores the implementation time, and wherein the communication device further comprises a clock for generating time values.

9. The communication system of claim 8, wherein the communication device further comprises an implementer for monitoring the time values and, when a time value is equivalent to the implementation time, for storing the configuration information as operational information that is thereafter utilized by the processor in operating the communication device.

10. The communication system of claim 8, wherein the communication device further comprises a responder for determining whether the configuration information is acceptable, for confirming the configuration information when it is acceptable, and for rejecting the configuration information when it is unacceptable.

11. A network manager for synchronizing implementation of configuration information, the network manager comprising:

data ports for transmitting the configuration information to communication devices and for receiving, in response, confirmations and rejections from the communication devices; and a notifier coupled to the data ports for transmitting, in response to receiving the confirmations from the communication devices, an implementation time at which the communication devices begin to utilize the configuration information.

12. The network manager of claim 11, further comprising:

a controller coupled to the notifier for controlling operations of the network manager; and a clock coupled to the controller for providing time values used in determining the implementation time.

13. The network manager of claim 12, further comprising:

an overrider coupled to the controller for overriding a rejection by sending the implementation time to confirming communication devices and not to rejecting communication devices.

14. The network manager of claim 12, further comprising:

a transmission database coupled to the controller for storing the configuration information, the confirmations, and the rejections.

15. The network manager of claim 12, further comprising:

a manager memory coupled to the controller for storing addresses of the communication devices, a confirmation code for recognizing the confirmations, and a rejection code for recognizing the rejections.

16. A communication device for implementing configuration information, the communication device comprising:

a receiver for receiving the configuration information;

a responder coupled to the receiver for transmitting a confirmation when the configuration information is acceptable and for transmitting a rejection when the configuration information is unacceptable, wherein the receiver receives an implementation time in response to transmission of the confirmation; and an implementer coupled to the receiver for utilizing the configuration information in response to occurrence of the implementation time.

17. The communication device of claim 16, further comprising:

a clock coupled to the implementer for generating time values used in determining when the implementation time has occurred.

18. The communication device of claim 17, further comprising:

a processor coupled to the receiver, the responder, and the implementer for controlling operations of the communication device; and a device memory for storing a confirmation code for generating the confirmation, a rejection code for generating the rejection, and operational information used by the processor in operating the communication device, the operational information including the configuration information only in response to occurrence of the implementation time.

19. A method for synchronizing implementation of configuration information in a communication system comprising a network manager and communication devices coupled to the network manager, the method comprising the steps of:

the network manager transmitting the configuration information to the communication devices;

the communication devices responding to the network manager with confirmations when the configuration information is acceptable;

the network manager providing an implementation time to the communication devices in response to reception of the confirmations; and the communication devices beginning to utilize the configuration information at the implementation time.

20. The method of claim 19, further comprising the step of:

the network manager storing the confirmations until all of the communication devices have confirmed, wherein the network manager provides the implementation time only when all of the communication devices have confirmed.

21. The method of claim 19, further comprising the step of:

the communication devices responding to the network manager with rejections when the configuration information is unacceptable, in response to which the network manager does not transmit the implementation time to the communication devices.

22. The method of claim 19, further comprising the steps of:

at least one of the communication devices responding to the network manager with a rejection when the configuration information is unacceptable;

the network manager determining whether the at least one of the communication devices is a necessary device;

the network manager overriding the rejection by sending the implementation time to confirming communication devices and not to the at least one of the communication devices in response to determining that the at least one of the communication devices is not necessary; and the network manager aborting implementation of the configuration information in response to determining that the at least one of the communication devices is necessary.

* * * * *